United States Patent [19]

Galantay

[11] 3,875,188

[45] Apr. 1, 1975

[54] 17-BETA-ALPHA-LOWER ALKYL ALLENE-SUBSTITUTED STEROIDS

[76] Inventor: Eugene E. Galantay, Rt. 18, Kemble Lake, Morristown, N.J. 07960

[22] Filed: Sept. 12, 1968

[21] Appl. No.: 759,516

Related U.S. Application Data

[63] Continuation-in-part of Ser. No. 720,342, April 10, 1968, Pat. No. 3,541,210.

[52] U.S. Cl. ................... 260/397.4, 260/239.55 R, 260/239.55 C, 260/397.4, 260/397.45, 260/397.5, 424/238, 424/243
[51] Int. Cl. ........................................... C07c 169/08
[58] Field of Search .............................. 260/397.4; /Machine Searched Steroids

[56] References Cited
UNITED STATES PATENTS

| | | | |
|---|---|---|---|
| 3,012,045 | 12/1961 | Cotton et al. | 260/397.4 |
| 3,067,214 | 12/1962 | Oberster et al. | 260/397.4 |
| 3,086,027 | 4/1963 | Perelman et al. | 260/397.3 |
| 3,336,347 | 8/1967 | Engelfried et al. | 260/397.5 |
| 3,340,279 | 9/1967 | Jongh et al. | 260/397.4 |
| 3,392,165 | 7/1968 | Edwards et al. | 260/239.55 |
| 3,392,166 | 7/1968 | Edwards et al. | 260/239.55 |
| 3,442,919 | 5/1969 | Feather et al. | 260/397.4 |

OTHER PUBLICATIONS

Smith, et al., Journ. Chem. Soc., Nov. 1964, pp. 4,472–4,492 pp. 4,476, 4,478, 4,487, 4,489 and 4,491 relied on.

Fieser and Fieser, *Steroids*, 1959, Rheinhold Publishing Corp., pg. 460 relied on.

*Primary Examiner*—Lewis Gotts
*Assistant Examiner*—Ethel G. Love
*Attorney, Agent, or Firm*—Gerald D. Sharkin; Richard E. Vila; Frederick H. Weinfeldt

[57] ABSTRACT

The compounds are 17-alpha(lower alkyl) allenyl steroids, e.g., 17α-(2′,3′-butadien-2′-yl)estra-4-en-17β-ol-3-one. The compounds have estrogenic/progestational activity.

31 Claims, No Drawings

17-BETA-ALPHA-LOWER ALKYL ALLENE-SUBSTITUTED STEROIDS

This is a continuation-in-part of my previously filed application U.S. Ser. No. 720,342 filed Apr. 10, 1968, now U.S. Pat. No. 3,541,210.

This invention relates to substituted steroids. More particularly it relates to 17α-(lower alkyl) allenyl carbinols and to the preparation thereof, as well as intermediates therefor.

The substituted carbinols of this invention may be represented by the following structural formula

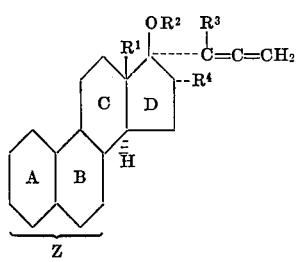

(I)

where
R$^1$ is alkyl having 1 to 3 carbon atoms,
R$^2$ is H, methyl or lower alkanoyl having 2 to 4 carbon atoms,
R$^3$ is alkyl having 1 to 3 carbon atoms,
R$^4$ is H, hydroxy, or lower alkanoyloxy, and
Z embracing rings A and B and the substituents thereon is

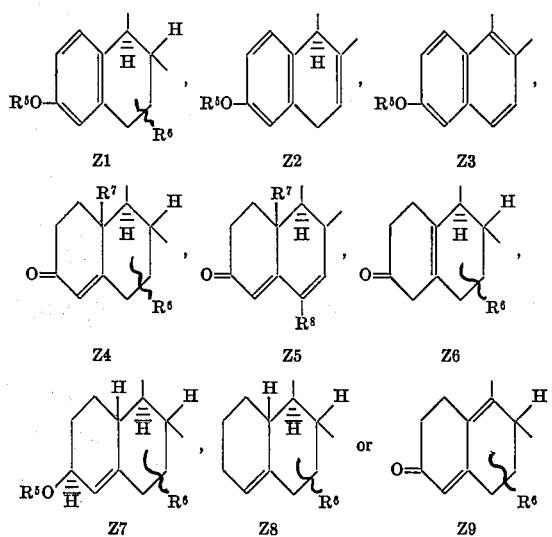

where
R$^5$ is H, lower alkyl having 1 to 3 carbon atoms, cycloalkyl, or lower alkanoyl having 2 to 4 carbon atoms,
R$^6$ is H, 6α-methyl or 7α-methyl,
R$^7$ is H, or methyl,
R$^8$ is H, halogen having an atomic weight of about 19 to 36, or methyl.

The process for preparing the compounds of formula (Ip) may be represented by the following reaction scheme A.

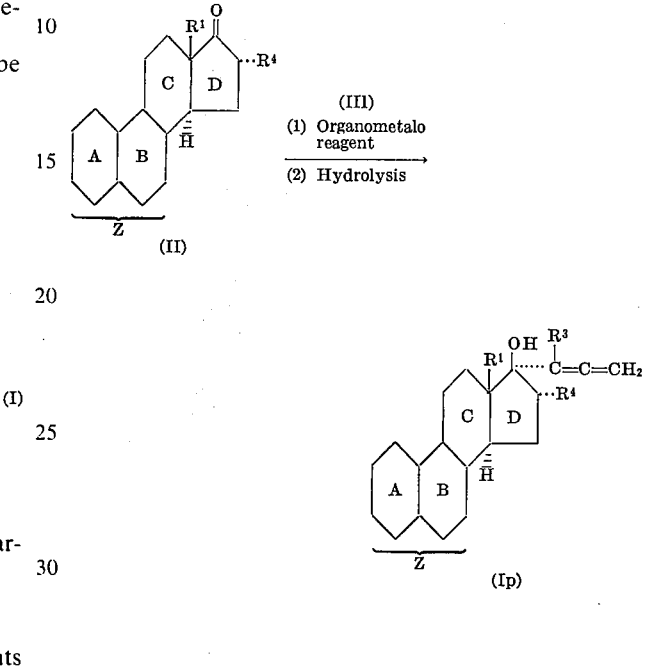

wherein R$^1$, R$^3$, R$^4$ and Z have the above-stated significance.

The organometalo reagent (III) is prepared by reacting in an aprotic solvent such as either,

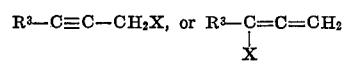

where X is chlorine, bromine or iodine with a metal such as magnesium, zine, lithium or aluminum.

Compound (Ip) is prepared by reacting the organometalo reagent (III) with a corresponding 17-ketosteroid (II) at a temperature of 0°C. to 100°C., preferably 30°C. to 50°C., followed by hydrolysis of the resulting adduct in neutral aqueous medium, e.g., water or saturated ammonium chloride solution.

Certain compounds of formula (II) are known and are prepared by methods disclosed in the literature. Those compounds of formula (II) not specifically disclosed are prepared according to analogous methods from known materials.

Compounds of formula (Ip) may be converted into the corresponding compounds of formula (I) where R$^2$ is methyl or lower alkanoyl by methods described hereinafter.

In accordance with an additional aspect of this invention the compounds of formula I may be prepared by the following reaction scheme B:

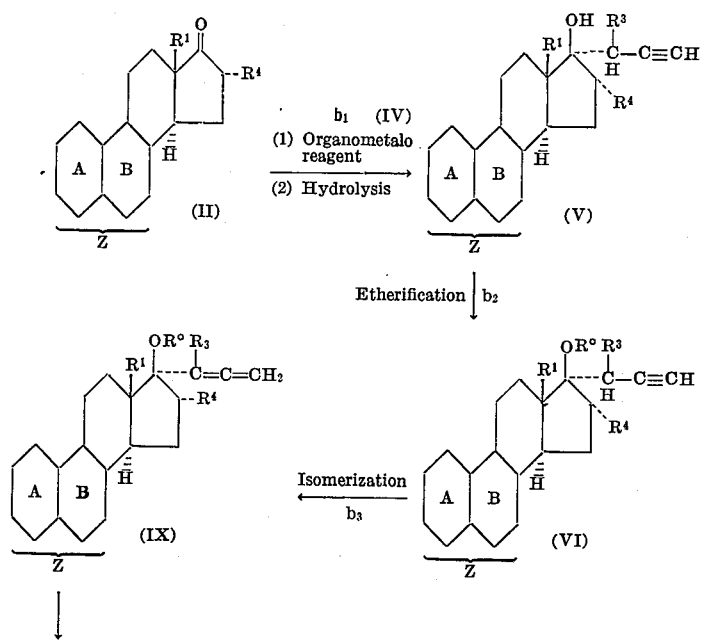

wherein $R^1$, $R^3$, $R^4$ and Z have the above-stated significance and $R^0$ signifies methyl or a protecting group stable under basic conditions, preferably tetrahydropyranyl.

The organometalo reagent (IV is prepared by reacting in an aprotic solvent such as ether,

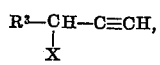

where X is chlorine, bromine or iodine with a metal such as magnesium, zinc, lithium or aluminum.

Compound V is prepared by reacting reagent IV with a corresponding 17-ketosteroid (II) at a temperature of 0° to 100° C., preferably 30° C. to 50° C., followed by hydrolysis of the resulting adduct in neutral aqueous medium, e.g., water or saturated ammonium chloride solution. This is represented by step $b_1$.

Step $b_2$ is an etherification of the steroidal 17β-carbinol (V) formed in step $b_1$. If the process is directed toward the preparation of compounds I wherein $R_2=CH_3$, then compound (V) is treated with lithium amide in liquid ammonia, followed by treatment with methyl iodide. If the process is directed toward the preparation of compounds (I) wherein $R_2$=hydrogen or lower alkanoyl, then the 17-OH group of compound (V) is protected in this step $b_2$ by a group stable under basic conditions, e.g., tetrahydropyranyl obtained by treatment with dihydropyrane in the presence of $POCl_3$.

Step $b_3$ is an isomerization and may be carried out in a solution of an alkali metal hydroxide (e.g., KOH, NaOH) at a temperature of 50° C. – 150° C. The preferred solvent is dimethyl sulfoxide. Other solvents which may be used are dimethylacetamide, ethanol, butanol and the like.

The preferred method of preparing a NaOH/dimethylsulfoxide solution is by adding the calculated amount of water to a solution of methylsulfinyl anion in dimethylsulfoxide (J. Amer. Chem. Soc. 84, 866 (1962).

If $R^0$ in compound (VI) is a protective group, this group is removed after isomerization to compounds (IX) (and replaced by an OH group), by the acid conditions usually employed for the splitting of such protective groups: p-toluenesulfonic acid hydrate in methanol, ethanol or benzene solution. Thus, compounds (I) are obtained in which $R^2$=H, from which compounds (I) wherein $R^2$=lower acyl) may be obtained by standard acylation methods known to affect tertiary carbinols: i.e., isopropenyl-(lower)acylate, i.e., isopropenyl acetate in the presence of acid catalysts, e.g., p-toluenesulfonic acid.

Conventional recovery techniques are utilized for obtaining the compounds of formula (I), e.g., crystallization, column or layer chromatography, etc.

Certain of the structures of formula (I) represented by Z are affected by the reaction conditions of schemes A and B. It is therefore a preferred embodiment of this invention to protect those Z structures which would be affected by means of standard protection groups which are stable to the reaction conditions. Such protected groups are readily transformed by known procedures to the desired Z forms.

The Z structures of formula (I) which are affected by the reaction conditions of schemes A and B are Z1, Z2, Z3 and Z7 where $R^5$ is not lower alkyl, Z4 where $R^7$=H, Z4 where $R^7$=$CH_3$, Z5, Z6 and Z9.

When the desired Z structure is Z1, Z2, Z3, Z7 where $R^5$ = lower alkyl then the protective groups is $R^5$ is not tetrahydropyranyl (P1).

When the desired Z structure is Z4 where $R^7$=H, then the group as protected is represented by ($P_2$ or $P_3$)

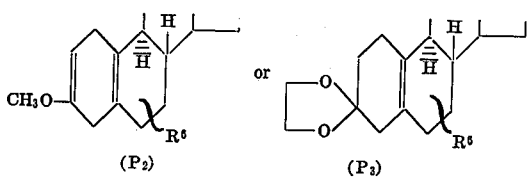

When the desired Z structure is Z4, where $R^7=CH_3$, then the group as protected is represented by ($P_4$)

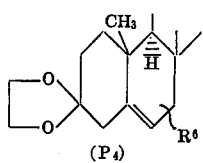

When the desired Z structure is Z5, then the group as protected is represented by ($P_5$)

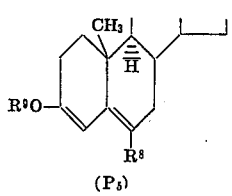

$R^9$ = lower alkanoyl having 2 to 4 carbon atoms, or alkyl

When the desired Z structure is Z6, then the group as protected is represented by ($P_2$) or ($P_3$).

When the desired Z structure is Z9, then the group as protected is represented by ($P_6$ or $P_7$)

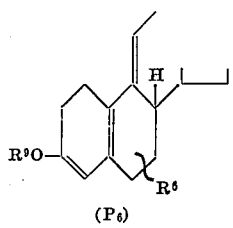

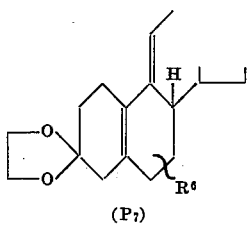

where $R^9$ = lower alkanoyl having 2 to 4 carbon atoms or alkyl

Illustrative of the process of this invention is the preparation of the compound represented by the formula

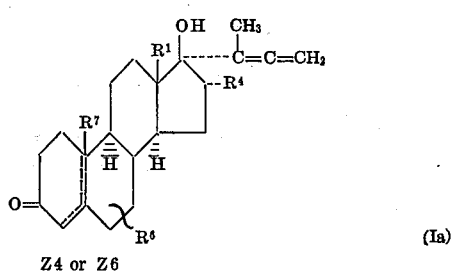

wherein $R^1$, $R^4$, $R^6$, $R^7$, Z4 and Z6 have the above-stated significance.

The compound of formula (Ia) may be prepared by the following reaction scheme C:

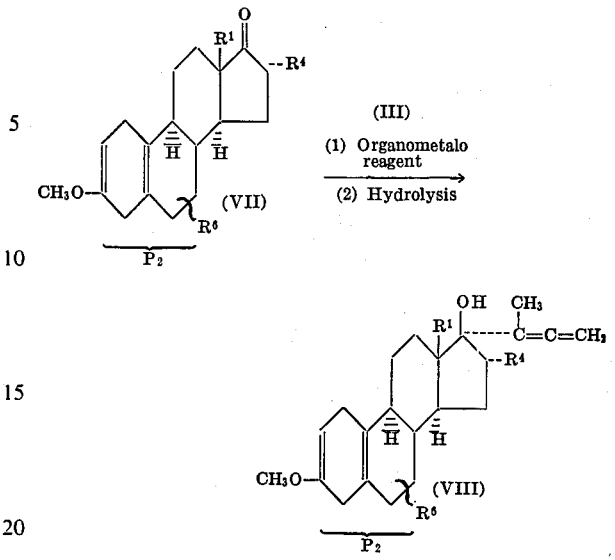

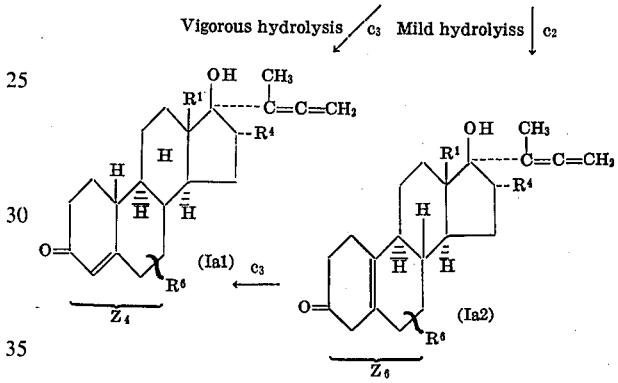

wherein $R^1$, $R^4$, $R^6$, P2, Z4 and Z6 have the above-stated significance.

The organometal. reagent (III) is prepared as described in scheme A. Compound VIII in step $c_1$, is prepared by reacting reagent (III) with a corresponding 3-methoxygona-2,5(10)-dien-17-one (VII) at a temperature of 0° to 100°C., preferably 30° to 50°C., followed by hydrolysis of the resulting adduct in basic or neutral aqueous medium, e.g., water, aqueous sodium hydroxide solution or saturated ammonium chloride solution.

Step $c_2$ is a mild hydrolysis, effected, preferably with oxalic acid, acetic acid or generally in acid media with a pH value above 2 and preferably between 3 and 5.

Step $c_3$ is more vigorous hydrolysis or rearrangement, effected preferably with hydrochloric acid. The pH value is lower than that of step $c_2$ and preferably between 1 and 2. Step $c_3$ may also be performed under mild acid conditions, wherein the reaction is carried out for a longer period of time and at a higher temperature than under strong acid conditions.

Steps $c_2$ and $c_3$ may be carried out at temperatures from 0° to 50°C.

Certain compounds of formula (VII) are known and are prepared by methods disclosed in the literature. Those compounds of formula VII not specifically disclosed are prepared according to analogous methods from known materials.

Conventional recovery techniques are utilized for obtaining compounds (Ia1-) and (Ia2-), e.g., crystallization, column or layer chromatography, etc.

The preferred compounds of formula (I) are as described above with the proviso that R⁶ is not H, in Z1, Z4, Z6 or Z7.

The preferred compounds of formula (Ia) are 17α-(2′, 3′-butadien-2′-yl)-estra-4-en-17β-ol-3-one

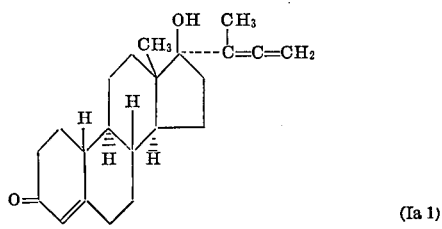
(Ia 1)

and 17α-(2′,3′-butadien-2′-yl)-estra-5(10)-en-17β-ol-3-one

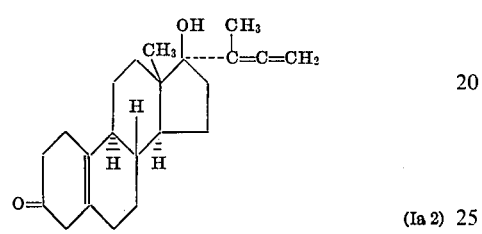
(Ia 2)

The substituted carbinol derivatives represented by formula (I) above are useful because they possess pharmacological properties in animals. In particular, such compounds are useful as fertility control agents in animals. Compounds (I) where Z is Z1 to Z3 possess progestational activity as indicated either by the test method basically described by Elton R. L., et al., Experientia vol. XXII (1966) wherein the rabbit is given 4 milligrams of active agent per day for 8 days; or by the method basically described in Endocrinology 63 (1958) 464 wherein the rabbit is given 0.01 to 1.0 milligrams of active agent. Compounds (I) where Z is Z1 to Z3 possesses estrogenic activity in the rat as determined by the method basically described in Endocrinology 65 (1959) and Am. J. Physiol. 189 (1957) 355, respectively.

The compound of formula (I) wherein Z is Z4 to Z9 possess progestational activity as indicated either by the test method basically described by Elton R. L., et al., Experientia Vol. XXII (1966) wherein the rabbit is given 4 milligrams of active agent per day for 8 days or by the method basically described in Endocrinology 63 (1958) 464 wherein the rabbit is given 0.01 to 1.0 milligrams of active agent.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.05 milligrams to 10 milligrams. This daily dosage is preferably given in equally divided doses, e.g., 1 to 2 times a day, or in sustained release form. It will be appreciated by those skilled in the art, that the daily dosage level is independent of body weight. Dosage forms suitable for internal administration comprise from about 0.025 milligrams to about 10 milligrams of the compound in admixture with a solid or liquid pharmaceutical carrier or diluent.

The novel structural feature in ring D of formula (I)

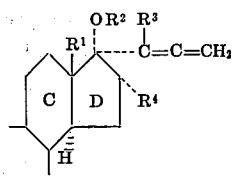
(d₁)

is unique in bringing about, developing or strengthening the progestational activity, potentially carried by the remaining rings A, B and C of formula (I). It has been found that the structure of (d₁) (shown above) is generally associated with excellent absorbability in the per os administration route, assuring a more useful progestational effect.

The compound of formula (Ia) has at least 4,000% of the activity of the comparable standard Norethisterone (17α-ethynylestra-4-en-17β-ol-3-one) as measured by the Clauberg assay on immature rabbits. A similar effect is obtained in all cases of combining the structure of (d₁) (shown above) with Z4 to Z9.

Alternatively the compounds of formula (I) may have Z1 to Z3. It is known that steroid compounds with Z1 to Z3 combined with rings C and D, e.g.,

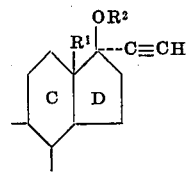
(d₂)

exhibit a strongly estrogenic rather than progestational activity. It has been found that in compounds (I) where Z is Z1 to Z3 the estrogenic activity is suppressed and a mixed progestational-estrogenic activity is observed, with the progestational activity very significant if not predominating.

By selecting the appropriate Z structure it is possible to prepare highly active "pure" progestational compounds (as indicated by the Clauberg test) of high absorbability. Such compounds, as predicted on the basis of well-established endocrinological assays, are useful in controlling fertility of higher primates. They can be used alone in a purely progestational type of treatment, or, preferably, in admixture (or "sequentially") with minor quantities of estrogenic materials. The use of progestins in the control of fertility is well known and established.

Also by selecting the appropriate Z structure, it is possible to prepare compounds of deciduogenic activity, i.e., compounds with a mixed progestational-estrogenic activity, again of high absorbability. These compounds offer a novel approach to fertility control in higher primates, i.e., a progestational-estrogenic therapy by the administration of only one chemical species during the whole period of treatment. Such compounds are also eminently useful controlling symptoms which can lead back to ovarian deficiency.

A representative formulation suitable for oral administration is a tablet prepared by standard tabletting techniques which contains the following:

| Ingredients | Parts by Weight |
| --- | --- |
| 17α-(2′-butyn-1′-yl)-estra-4-en-17β-ol-3-one | 2.5 |
| tragacanth | 2 |
| lactose | 87 |
| corn starch | 5 |

-Continued

| Ingredients | Parts by Weight |
|---|---|
| talcum | 3 |
| magnesium stearate | 0.5 |

This invention is illustrated but not limited by the following examples.

EXAMPLE 1A (2'-Butyn-1'-yl)-3-methoxyestra-2,5(10)-dien-17β-ol

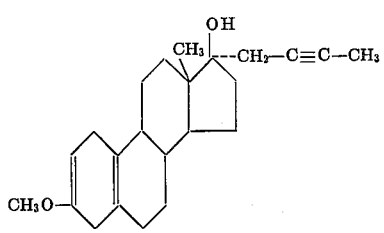

A Grignard mixture was prepared from 4.08 grams of magnesium turnings and 24.6 grams of 2-butyn-1-yl bromide under 60 ml. of anhydrous ethyl ether. A solution of 3.0 grams of 3-methoxyestra-2,5(10)-dien-17-one in 50 ml. of tetrahydrofuran was added dropwise (25 minutes) at 5°C. to the Grignard mixture. The mixture was then reacted at 25°C. for 90 minutes. The Grignard adduct was then cooled to 10°C. and 100 mg. of di-tert butyl methyl phenol added. This mixture was then decomposed by the dropwise addition of 100 ml. of 5% sodium hydroxide solution. A gelatinous mass formed which was filtered after setting 15 minutes at room temperature. The filtrate was washed 3 times with 25 ml. of ethyl acetate. The filtrate and washings were then washed with water (3 × 25 ml.), dried with $Na_2SO_4$ and evaporated to dryness. An oily residue was obtained and the 17α-(2'-butyn-1'-yl)-3-methoxyestra-2,5(10)-dien-17β-ol (m.p. 133°–139°C.) was crystallized from heptane.

EXAMPLE 1B

17α-(2',3'-Butadien-2'-yl)-estra-4-en-17β-ol-3-one

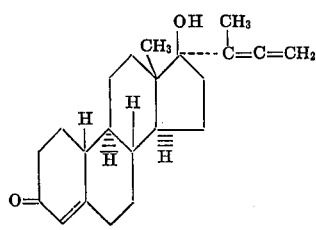

The heptane mother liquor of Example 1 was evaporated to dryness to yield 5.59 g. of a dark oil. This was dissolved in a mixture of 12.5 ml. of methanol and 0.36 ml. of concentrated 11 N aqueous hydrochloric acid and kept at 30°C. for 30 minutes. The solution was then diluted with 40 ml. of water and extracted with methylene chloride to yield 5.5 gms of an oil. The oil was chromatographed on a silica gel column. The fractions having a selective U.V. absorption at 241 mu were further purified on preparative thin layer plates with silica gel H carrier. The 17α-(2',3'-butadien-2'-yl) estra-4-en-17β-ol-3-one is eluted (chloroform-methanol 98:2) from a band having an $R_f$ of 0.25 and crystallized from ether, m.p. 122°–125°C.)

EXAMPLE 2

17α-(2',3'-butadien-2'-yl)-estra-5(10)-en-17β-ol-3-one

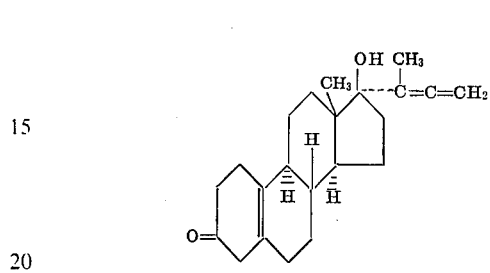

The heptane mother liquor of Example 1a was evaporated to dryness to yield a dark oil, 3.0 G. of this was dissolved in a mixture of 30 ml. of glacial acetic acid and 3 ml. of water. After 2 hours, 200 ml. water was added and the product extracted with ethyl acetate (5 × 10 ml). Evaporation of the ethyl acetate extracts gave an oil, which yielded the title product on chromatography, first on a volume (silica gel), then on preparative thin layer plates with silica gel G as a carrier.

EXAMPLE 3

17α-(buta-1',2'-dien-3'-yl)-3-methoxyestra-1,3,5(10)-trien-17β-ol

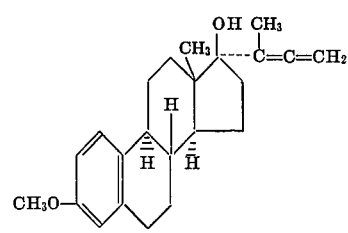

A solution of 23.5 g of 1-bromo-2-butyne in 50 ml of anhydrous ethyl ether was added dropwise with stirring to a mixture of 4.73 g of magnesium turnings, 20 mg of mercuric chloride and 25 ml of anhydrous ethyl ether. After formation of the resulting Grignard reagent was complete the mixture was cooled to 5° C. and a solution of 10 g of estrone-3-methyl ether in 100 ml of tetrahydrofuran was added. After stirring overnight at room temperature, the mixture was cooled and chloride solution was added. The resulting mixture was filtered and the filtrate evaporated to dryness. The filtered solids were washed three times (25 ml) with benzene and the benzene washings used to dissolve the filtrate residue. The resulting benzene solution was washed 3 times (20 ml) with water, dried and evaporated to give; 6.3 g of a gum, which was treated with 25 ml of ether-petroleum ether (1:1) to give the side product 17α-(2'-butyn-1' yl)-3-methoxyestra-1,3,5(10)-trien-17β-ol, mp 90°–104° C. The oily mother liquor was chromatographed on a Silica Gel column (400 g $SiO_2$, 50 × 500 mm) and eluted with benzene. The product was recovered recrystallized from isopropyl alcohol-hexane (2:1) giving the 17α-(buta-1',2'-dien-3'-yl)-3-methoxyestra-1,3,5(10)-trien-17β-ol, mp 120° – 122° C.

EXAMPLE 4

17α-(buta-1',2'-dien-3'-yl)-3-methoxyestra-1,3,5(10),7-tetraen-17β-ol

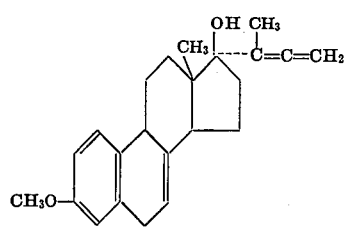

By substituting equilin methyl ether for estrone methyl ether in Example 3, an working under the conditions specified there, the title compound 17α-(buta-1',2'-dien-3'-yl)-3-methoxyestra-1,3,5(10),7-tetraen-17β-ol is obtained.

EXAMPLE 5

17α-(buta-1',2'-dien-3'-yl)-3-methoxyestra-1,3,5(10)-6,8-pentaen-17β-ol

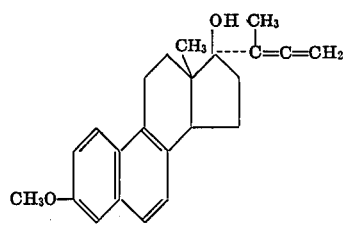

By substituting equilenin methyl ether for estrone methyl ether in Example 3 and working under the conditions described there, the title compound 17α-(buta-1',2'-dien-3'-yl)-3-methoxyestra-1,3,5(10)-6,8-pentaen-17β-ol is obtained.

EXAMPLE 6

17α-(buta-1',2'-dien-3'-yl)estra-4-en-17β-ol

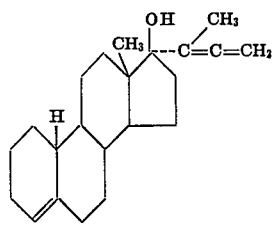

By substituting estra-4-en-17-one for the estrone methyl ether in Example 3 and working under the conditions described there, the title product 17α-(buta-1',2'-dien-3'-yl)estra-4-en-17β-ol is obtained.

EXAMPLE 7

3-cyclopentyloxy-17α-(penta-1',2'-dien-3'-yl)estra-1,3,5(10)-trien-17β-ol

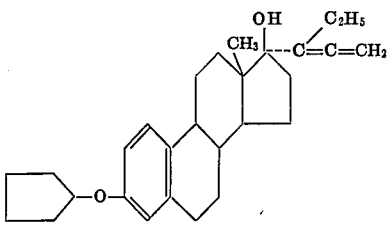

A Grignard reagent is prepared from 1-bromo-2-pentyne (27.0 g) and 4.8 g of magnesium turnings in ether, as described in Example 3 for 1-bromo-2-butyne. Estrone cyclopentyl ether is then added and the reaction carried out analogously to Example 3 to obtain the title 3-cyclopentyloxy-17α-(penta-1',2'-dien-3'-yl)estra-1,3,5(10)-trien-17β-ol compound.

EXAMPLE 8 d,l-17α-(buta-1',2'-dien-3'-yl)-3,17β-diacetoxy-13-ethylgona-1,3,5(10)-triene

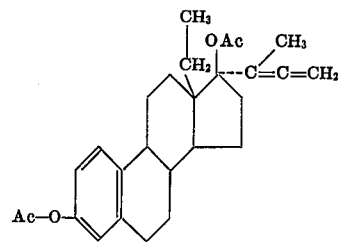

Step a: To a stirred suspension of 5.7 g of granular zinc in 5.0 ml of tetrahydrofuran is slowly added at 10° C., 11.6 g of 3-bromo-1-butyne, dissolved in 60 ml of tetrahydrofuran. To the zinc reagent thus prepared, a solution of 5.0 g of d,l-13-homoestrone-tetrahydropyranyl-ether was added and the mixture stirred at room temperature for 18 hours. After careful decomposition with 100 ml of 2N aqueous NaOH solution, the product of this step (a)

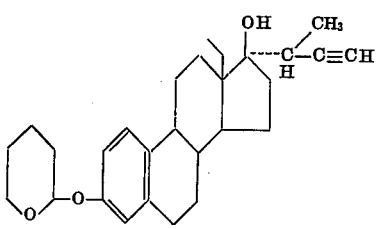

d,1-17α-(1'-butyn-3'-yl)-13-ethyl-3-tetrahydropyranyl-oxygona-1,3,5(10)-trien-17β-ol is obtained as a foam, by extracting the reaction mixture with ethyl acetate (5 × 100 ml) and evaporating the washed (3 × 20 ml of water) and dried (Na₂SO₄) ethyl acetate extracts.

Step b: The product of step (a) was then added to a mixture prepared from 200 ml of tetrahydrofuran, 45 ml of dihydropyran and 0.3 ml of POCl₃ (phosphorus oxychloride). After 5 hours at room temperature, the mixture is poured into 200 ml ice cold 2N sodium hydroxide solution, and the product of this step (b)

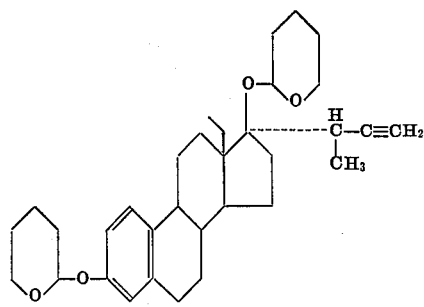

d,1-17α-(1'-butyn-3'-yl)-3,17β-di-tetrahydropyranyloxy-13-ethylgona-1,3,5(10)-triene is obtained as an oil, by extraction with (5 × 50 ml) methylene chloride.

Step c: The product from step (b) is subjected to isomerization by heating it for 18 hours at 70°, with a NaOH-dimethylsulfoxide solution (prepared by dissolving 12 g of NaH in ml of dry dimethylsulfoxide at 70°, then adding, under cooling 8.55 g of water). The product from this step (c), an oil, is obtained by pouring the mixture on 500 g of ice, extracting with 5 × 50 ml of benzene and evaporating the dried benzene solution to dryness. The product of this step (c) is

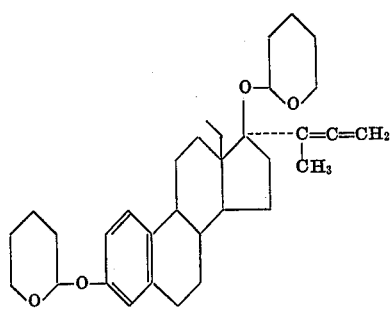

d,1-17α-(buta-1',2'-dien-3'-yl)-3,17β-di-tetrahydropyranyloxy-13-ethylgona-1,3,5(10)-triene.

Step d: Product of the step (c) is allowed to stand, at room temperature for 24 hours, in a solution of 5 g p-toluenesulfonic acid hydrate in 150 ml of methanol. Adding water and extraction with (5 × 50 ml) ethyl acetate, evaporation of the organic layer to dryness gave

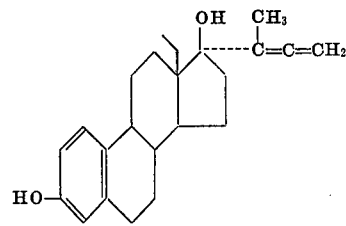

d,1-17α-(buta-1',2'-dien-3'-yl)-3,17β-di-hydroxy-13-ethylgona-1,3,5(10)-triene.

Step e: Product of the step (d) is dissolved in 80 ml of isopropenyl acetate containing 1.0 g of p-toluenesulfonic acid; after 24 hours at room temperature, the mixture diluted with 200 ml of ethyl acetate washed, at 0°, with (3 × 50 ml) 10% NaHCO₃ solution followed by washing with (3 × 50 ml) water. After drying, the solution is evaporated to dryness and the product purified by chromatography on a silica gel column (60 g) in a benzenechloroform system. The thus-purified title product of this present example

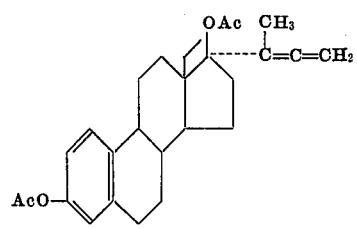

was finally recrystallized from 35 ml of ether to give the crystalline material.

EXAMPLE 9

17α-(Buta-1',2'-dien-3'-yl)-17β-methoxy-7α-methylestra-5(10)-en-3-one

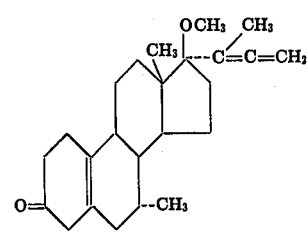

Step a: By substituting

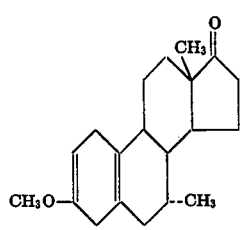

3-methoxy-7α-methylestra-2,5(10)-dien-17-one for estrone tetrahydropyranyl ether, in Example 8, step (a), we obtain, analogously

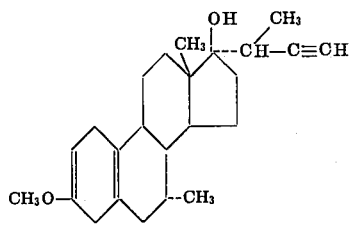

17α-(1'-butyn-3'-yl)-3-methoxy-7α-methylestra-2,5(10)-dien-17β-ol.

Step b: To a lithium amide suspension (prepared from 0.7 g. of lithium metal, 150 ml. of liquid ammonia and a catalytic amount of ferric nitrate) is added 3.54 g. of the above product dissolved in 150 ml. of tetrahydrofuran. After 2 hours at −35°, 14.2 g. of methyl iodide is added; finally, after 3 further hours at −35°, the ammonia is allowed to escape. 0.01 g. of di-tert-butylcresol and 200 ml. of water is carefully added and the mixture concentrated in vacuo (30 mm. 15°) until the product of this step (b)

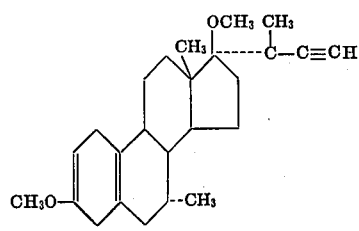

17α-(1'-butyn-3'-yl)-3,17β-dimethoxy-7α-methylestra-2,5(10)-diene, as a solid, precipitates and can be isolated by filtration.

Step c: The product of this last step (step b) is substituted for the starting material used in Example 8 Step c, and processed analogously to obtain

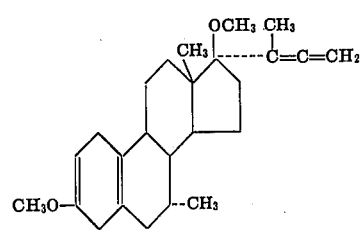

Step d: Product of the latter step (c) is allowed to react with a solution of 5.0 g. of oxalic acid in 100 ml. of 90% methanol. After 12 hours at 30°C., more water is added and the product is extracted with 5 × 20 ml. of methylene chloride. Evaporation of the washed and dried methylene chloride layers gives the title product 17α-(buta-1',2'-dien-3'-yl)-17β-methoxy-7α-methylestra-5(10)-en-3-one.

EXAMPLE 10

17α-(hexa-1',2'-dien-3'-yl)-6α-methyl-androst-4-en-17β-ol-3-one

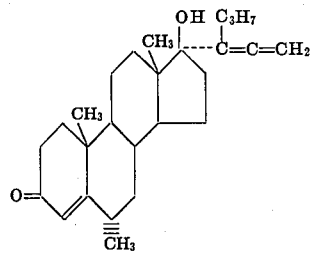

Substituting 3-ethylenedioxy-6-methyl-androst-5-en-17-one

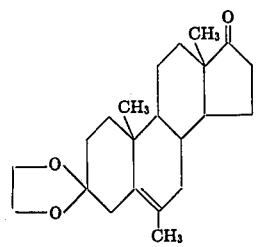

for estrone-tetrahydropyranyl ether in Example 8, step (a); preparing in the same step (a) the zinc organic reagent from 3-bromo-1-hexyne (instead of 3-bromo-1butyne) and finally, carrying the material thus obtained through treatments described in Example, steps b, c and d, the title product 17α-(hexa-1',2'-dien-3'-yl)-6α-methyl-androst-4-en-17β-ol-3-one is obtained. It is purified by column chromatography on 60 g of silica gel moiety benzene-chloroform 1:4 as the eluent and is recrystallized from acetone-methanol.

EXAMPLE 11

17α-(buta-1',2'-dien-3'-yl)estra-4,9-dien-3-one

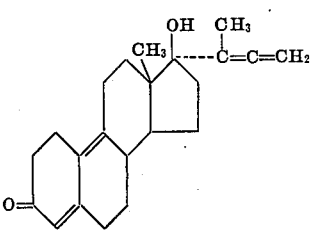

Substituting the 3-ethylenedioxyestra-5(10), 9(11)-dien-17-one

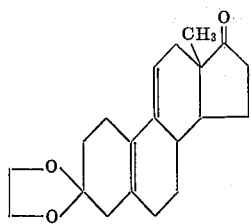

for the d,1-13-homoestrone-tetrahydropyranyl ether of Example 8 and working analogously to steps (a), (b), (c), and (d) the title product 17α-(buta-1',2'-dien-3'-yl)estra-4,9-dien-3-one is obtained.

EXAMPLE 12

17α-(buta-1',2'-dien-3'-yl)-6-fluoroandrosta-4,6-dien-17β-ol-3-one

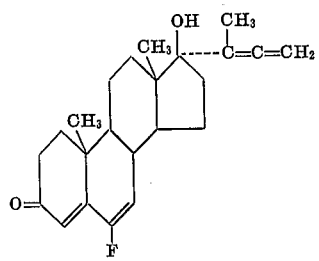

By substituting the 3-enol ethyl ether of 6-fluoroandrosta-4,6-diene-3,17-dione

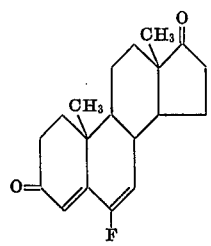

for estrone tetrahydropyranyl ether in Example 8, step (a), and working analogously to steps (b), (c) and (d), the title product 17α-(buta-1',2'-dien-3'-yl)-6-fluoroandrosta-4,6-dien-17β-ol-3-one is obtained.

EXAMPLE 13

17α-(buta-1',2'-dien-3'-yl)-6-chloroandrosta-4,6-dien-17β-ol-3-one

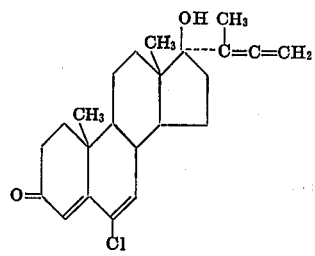

By substituting the 6-chloroandrosta-4,6-diene-3,17-dione for the estrone tetrahydropyranyl ether in Example 8 step (a) and working analogously to steps (b), (c) and (d), the title product 17α-(buta-1',2'-dien-3'-yl)-6-chloroandrosta-4,6-dien-17β-ol-3-one is obtained.

EXAMPLE 14

17α-(buta-1',2'-dien-3'-yl)-6-methylandrosta-4,6-dien-17β-ol-3-one

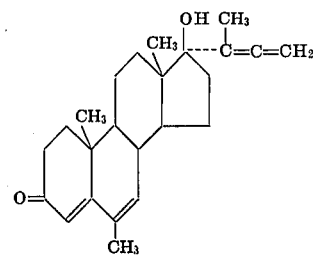

By substituting the 6-methylandrosta-4,6-diene-3,17-dione for the estrone tetrahydropyranyl ether in Example 8 step (a) and working analogously to steps (b), (c) and (d) the title product 17α-(buta-1',2'-dien-3'-yl)-6-methylandrosta-4,6-dien-17β-ol-3-one is obtained.

EXAMPLE 15

17α-(buta-1',2'-dien-3'-yl)-6α-methylestra-4-en-17β-ol-3-one

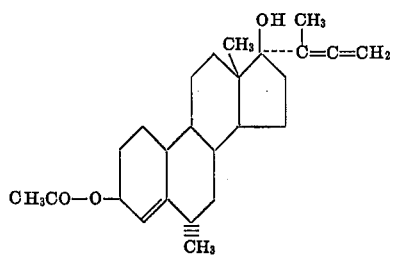

By substituting 3-ethylene-dioxy-6α-methylestra-5(10)-en-17-one as starting material in Example 8 and carrying out steps (a), (b), (c) and (d), the title product 17α-(buta-1',2'-dien-3'-yl)-6α-methylestra-4-en-3-one is obtained.

EXAMPLE 16

3β-acetoxy-17α-(buta-1',2'-dien-3'-yl)-6α-methylestra-4-en-17β-ol

Step a: To a mixture of 2.54 g of lithium-tri-t-butoxyaluminum hydride in 350 ml of ether-diglycine 1:1, at −40°, there is dropwise added a solution of 3.00 g of the title product of example 15, i.e. 17α-(buta-1',2'-dien-3'-yl)-6α-methylestra-4-en-17β-ol-3-one, dissolved in 200 ml of ether-benzene 8:1. After standing at 0° for 12 hours, ice cold 5N sodium hydroxide is added. Separation, washing, drying and evaporation of the organic layer yields

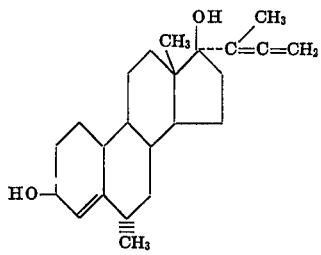

17α-(buta-1',2'-dien-3'-yl)-3β, 17β-dihydroxy-6α-methylestra-4-ene, purified by crystallization from methanol.

Step b: Latter is dissolved in 50 ml of pyridine; 11 ml of acetic anhydride is dropwise added. After 24 hours at room temperature, water is added and the title product 3β-acetoxy-17α-(buta-1',2'-dien-3'-yl)-6α-methylestra-4-ene is filtered off as a solid, crystallized from ethyl acetate.

EXAMPLE 17

17α-(Buta-1',2'-dien-3'-yl)-3,16α-diacetoxyestra-1,3,5(10)-trien-17β-ol

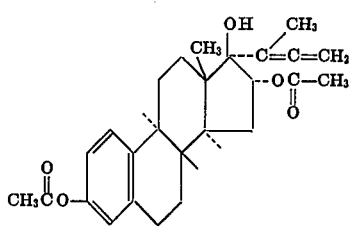

Step A. Preparation of 17α-(2'-butyn-1'-yl)-estra-1,3,5(10)-triene-3,16α,17β-triol

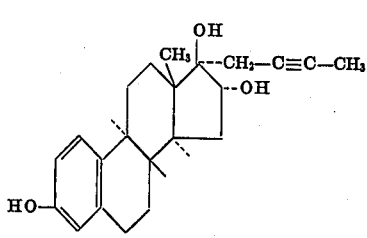

and 17α-buta-(1',2'-dien-3'-yl)-estra-1,3,5(10)-trien-3,16α,17β-triol

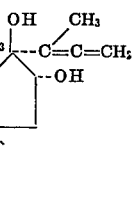

A Grignard reagent is prepared from 5.2 g. of activated magnesium, 32.2 g. of 1-bromo-2-butyne and 51 ml. of diethyl ether.

To the Grignard reagent is added, with stirring at 40°C. over a period of 10 minutes, a solution of 2.600 g. of 3,16α-diacetoxyestra-1,3,5(10)-trien-17-one in 8.5 ml. of tetrahydrofuran resulting in a semi-soild mixture, which is stirred for an additional 18 minutes. The semi-solid mixture is then cooled in an ice bath, 400 ml. of saturated aqueous ammonium chloride added, the solids are separated by filtering and the filtrate and solids are each extracted 5 times with 50 ml. portions of diethyl ether. The combined ethereal extracts are dried over anhydrous sodium sulfate and the solvent removed by evaporation under vacuum at 20°C. to obtain an oily residue. To the oily residue is added with stirring at room temperature (20°C.) 50 ml. of heptane resulting in the conversion of the oily residue to a solid. The soild is recovered by filtration, dried under vacuum and recrystallized from 100 ml. of chloroform to give a solid melting at 175° to 178° C. consisting of a mixture (in a weight ratio of about 3 to 2 parts) of 17α-(2'-butyn-1'-yl)-estra-1,3,5(10)-trien-3,16α,17β-triol and 17α-(buta-1',2'-dien-3'-yl)-estra-1,3,5(10)-trien-3,16α,17β-triol.

Step B. Acetylation 0.817 g. of the solid mixture of 17α-(2'-butyn-1'-yl)-estra-1,3,5(10)-trien-3,16α,17β-triol and 17α-(buta-1',2'-dien-3'-yl)-estra-1,3,5(10)-trien-3,16α,17β-triol, prepared according to Step A is added to a solution of 4.32 ml. of acetic anhydride in 13.0 ml. of pyridine and the resulting mixture stirred at room temperature (20°C.) for 17 hours, after which period the mixture is poured into 100 ml. of water and extracted 5 times with 10 ml. portions of methylene chloride. The combined methylene chloride extracts are dried over anhydrous sodium sulfate and the solvent removed by evaporation under vacuum to obtain a crystalline solid.

Step C. Recovery 0.8856 g. of the crystalline solid obtained according to Step B is dissolved in 5 ml. of chloroform. The chloroform solution is applied to fine Silica Gel H* plates (38 cm. by 20 cm.; 0.1 cm. in thickness) and the chromatogram developed vertically in ascending fashion with chloroform as solvent.

* "Silica Gel H" according to Stahl manufactured by Merck A. G. of Darmstadt, Germany.

The fastest moving band (between $R_f$ 0.45 and 0.55) is eluted with ethyl acetate to recover the title product 17α-(buta-1',2'-dien-3'-yl)-3,16α-diacetoxyestra-1,3,5(10)-trien-17β-ol, m.p. 155° to 158°C.

What is claimed is:

1. A compound of the formula

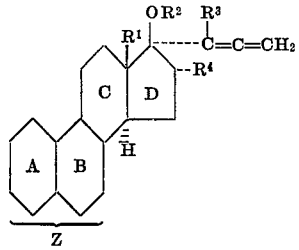

where
R¹ is alkyl having 1 to 3 carbon atoms;
R² is H, methyl or lower alkanoyl having 2 to 4 carbon atoms;
R³ is alkyl having 1 to 3 carbon atoms
R⁴ is H, hydroxy, or lower alkanoyloxy and
Z embracing rings A and B and the substituents thereon is

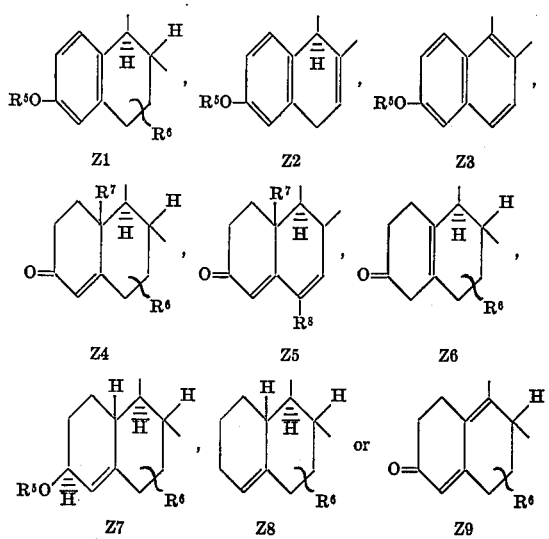

where
R⁵ is H, lower alkyl having 1 to 3 carbon atoms, cycloalkyl, or lower alkanoyl having 2 to 4 carbon atoms,
R⁶ is H, 6α-methyl or 7α-methyl,
R⁷ is H, or methyl,
R⁸ is H, halogen having an atomic weight of about 19 to 36, or methyl;
with the proviso that when Z is Z1, and R⁵ is H or lower alkanoyl, and R₆ is H, then R₄ is H.

2. A compound of claim 1, wherein R⁶ is not H when Z is Z1, Z4, Z6 or Z7.

3. A compound having the formula

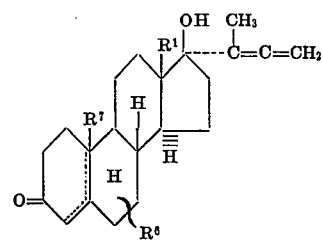

wherein
R¹ is alkyl having 1 to 3 carbon atoms,
R⁶ is H, 6α-methyl or 7α-methyl, and
R⁷ is H when the double bond is in the 4,5-position.

4. The compound of claim 3 which is 17α-(2',3'-butadien-2'-yl)-estra-4-en-17β-ol-3-one.

5. The compound of claim 3 which is 17α-(2',3'-butadien-2'-yl)-estra-5(10)-en-17β-ol-3-one.

6. The compound of claim 1 which is 17α-(buta-1',2'-dien-3'-yl)-3-methoxy-estra-1,3,5(10)-trien-17β-ol.

7. The compound of claim 1 which is 17α-(buta-1',2'-dien-3'-yl)-3-methoxyestra-1,3,5(10), 7-tetraen-17β-ol.

8. The compound of claim 1 which is 17α-(buta-1',2'-dien-3'-yl)-3-methoxyestra-1,3,5(10)-6,8-pentaen-17β-ol.

9. The compound of claim 1 which is 3-cyclopentyloxy-17α-(penta-1',2'-dien-3'-yl)-estra-1,3,5,(10)-trien-17β-ol.

10. The compound of claim 1 which is d,1-17α-(buta-1',2'-dien-3'-yl)3,17β-diacetoxy-1,3,5(10)-triene.

11. The compound of claim 1 which is 17α-(hexa-1',2'-dien-3'-yl)-6α-methyl-androst-4-en-17β-ol-3-one.

12. The compound of claim 1 which is 17α-(buta-1',2'-dien-3'-yl)-6-fluoro-androsta-4,6-dien-17β-ol-3-one.

13. The compound of claim 1 which is 17α-(buta-1',2'-dien-3'-yl)-17β-methoxy-7α-methylestra-5(10)-en-3-one.

14. The compound of claim 1 which is 17α-(buta-1',2'-dien-3'-yl)6α-methylestra-4-en-17β-ol-3-one.

15. The compound of claim 1 which is 3β-acetoxy-17α-(buta-1',2'-dien-3'-yl)-6α-methylestra-4-en-17β-ol.

16. The compound of claim 1 which is 17α-(buta-1',2'-dien-3'-yl)estra-4-en-17β-ol.

17. The compound of claim 1 which is 17α-(buta-1',2'-dien-3'-yl)estra-4,9-dien-17β-ol-3-one.

18. The compound of claim 1 which is 17α-(buta-1',2'-dien-3'-yl)-6-chloro-androsta-4,6-dien-17β-ol-3-one.

19. The compound of claim 1 which is 17α-(buta-1',2'-dien-3'-yl)-6-methylandrosta-4,6-dien-17β-ol-3-one.

20. A compound of the formula

23

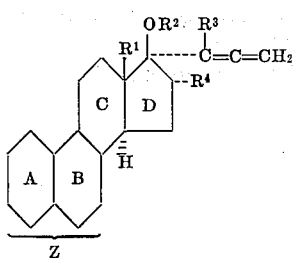

where
- $R^1$ is alkyl having 1 to 3 carbon atoms;
- $R^2$ is H, methyl or lower alkanoyl having 2 to 4 carbon atoms;
- $R_3$ is alkyl having 1 to 3 carbon atoms;
- $R^4$ is H, hydroxy, or lower alkanoyloxy; and
- Z embracing rings A and B and the substituents thereon is

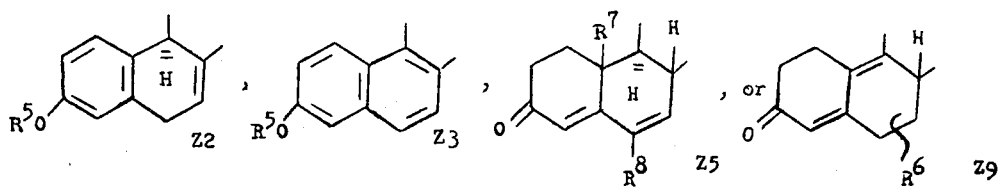

where
- $R^5$ is H, lower alkyl having 1 to 3 carbon atoms, cycloalkyl, or lower alkanoyl having 2 to 4 carbon atoms,
- $R^6$ is H, 6α-methyl or 7α-methyl,
- $R^7$ is H, or methyl,
- $R^8$ is H, halogen having an atomic weight of about 19 to 36, or methyl.

21. A compound of the formula

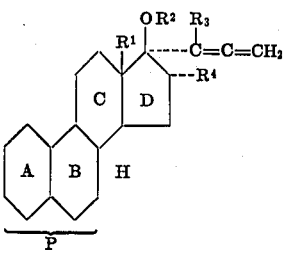

wherein
- $R^1$ is alkyl having 1 to 3 carbon atoms;
- $R^2$ is H, methyl or alkanoyl having 2 to 4 carbon atoms;
- $R^3$ is alkyl having 1 to 3 carbon atoms;
- $R^4$ is H, or hydroxy, or lower alkanoyloxy; and
- P embracing rings A, B and a portion of C and the substituents thereon is

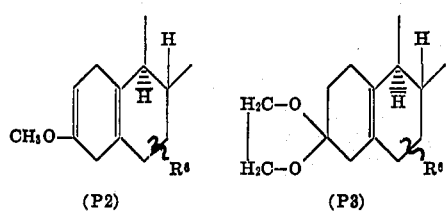

24

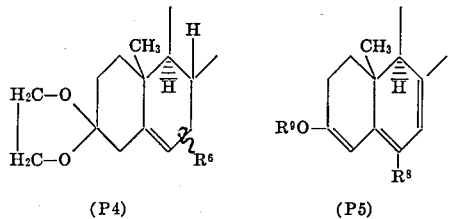

where
- $R^6$ is H, 6α-methyl or 7α-methyl,
- $R^8$ is H, halogen having an atomic weight of about 19 to 36, or methyl, and
- $R^9$ is alkyl.

22. A compound of the formula

[structure]

wherein:
- $R^1$ is selected from the group consisting of hydrogen, lower alkyl having 1 to 3 carbon atoms, cycloalkyl, a carboxylic acyl group of 2 to 4 carbon atoms and tetrahydropyran-2-yl;
- $R^2$ is selected from the group consisting of hydrogen and lower alkyl containing from 1 to 2 carbon atoms;
- $R^3$ is selected from the group consisting of hydrogen, a carboxylic acyl group of 2 to 4 carbon atoms and tetrahydropyran-2-yl;
- $R^4$ is methyl; and each of
- $R^5$ and $R^6$ is hydrogen.

23. A compound of the formula

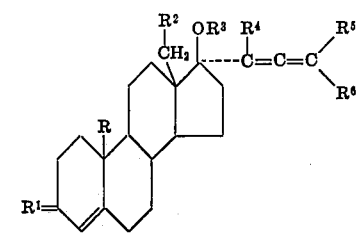

wherein
R¹ is selected from the group consisting of oxo and the group

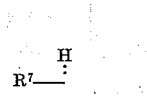

wherein R⁷ is selected from the group consisting of hydrogen, hydroxy, tetrahydropyran-2-yloxy, and a carboxylic acyloxy group containing 2 to 4 carbon atoms;
R is selected from the group consisting of hydrogen and methyl;
R² is selected from the group consisting of hydrogen and a lower alkyl containing from 1 to 2 carbon atoms;
R³ is selected from the group consisting of hydrogen, tetrahydropyran-2-yl, and a carboxylic acyl group containing 2 to 4 carbon atoms;
R⁴ is methyl and each of R⁵ and R⁶ is hydrogen.

24. A compound of the formula:

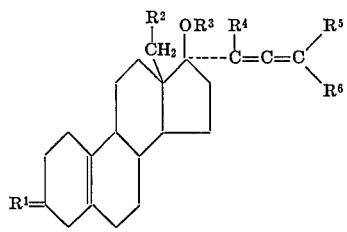

wherein:
R¹ is oxo;
R² is selected from the group consisting of hydrogen and a lower alkyl containing from 1 to 2 carbon atoms;
R³ is selected from the group consisting of hydrogen, tetrahydropyran-2-yl, and a carboxylic acyl group containing 2 to 4 carbon atoms;
R⁴ is methyl; and each of R⁵ and R⁶ is hydrogen.

25. A process for preparing a compound of the formula

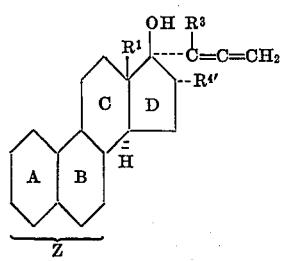

where
R¹ is alkyl having 1 to 3 carbon atoms;
R³ is alkyl having 1 to 3 carbon atoms
R₄' is H or hydroxy, and
Z embracing rings A and B and the substituents thereon is

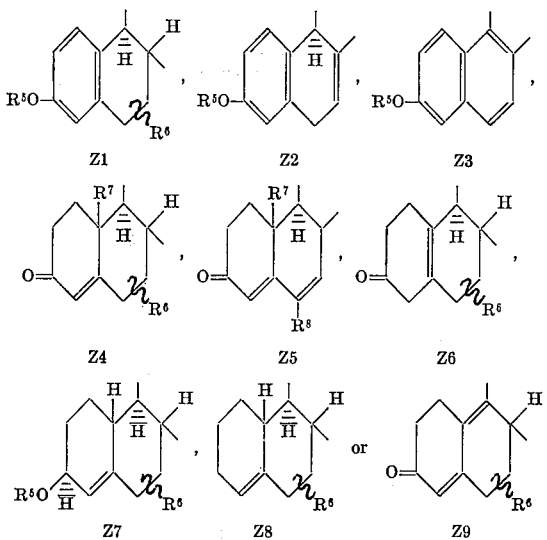

where
R⁵ is H, lower alkyl having 1 to 3 carbon atoms, cycloalkyl, or tetrahydropyranyl,
R⁶ is H, 6α-methyl or 7α-methyl,
R⁷ is H, or methyl,
R⁸ is H, halogen having an atomic weight of about 19 to 36, or methyl,
provided that when Z is Z1 and each of R⁵ and R⁶ is H, then R⁴ is H, which comprises treating a compound of the formula

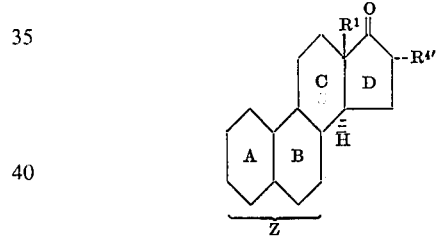

where Z, R¹· R⁴' and the proviso are as defined above with an organometallo reagent prepared by reacting a compound of the formula

R³—C ≡ C—CH₂X wherein R³ is alkyl having 1 to 3 carbon atoms, and wherein X is chlorine, bromine or iodine with a metal selected from the group consisting of magnesium, zinc, lithium or aluminum and hydrolyzing the resulting adduct.

26. A process for preparing a compound of the formula

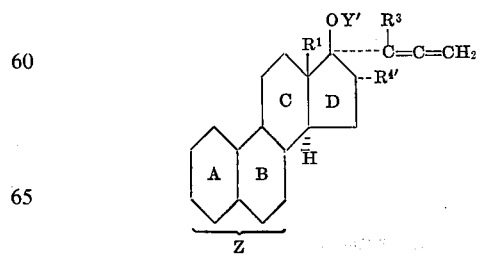

wherein
R$^1$ is alkyl having 1 to 3 carbon atoms,
R$^3$ is alkyl having 1 to 3 carbon atoms,
R$^{4'}$ is H or hydroxy,
Y' is tetrahydropyranyl or methyl,
Z embracing rings A and B and the substituents thereon is

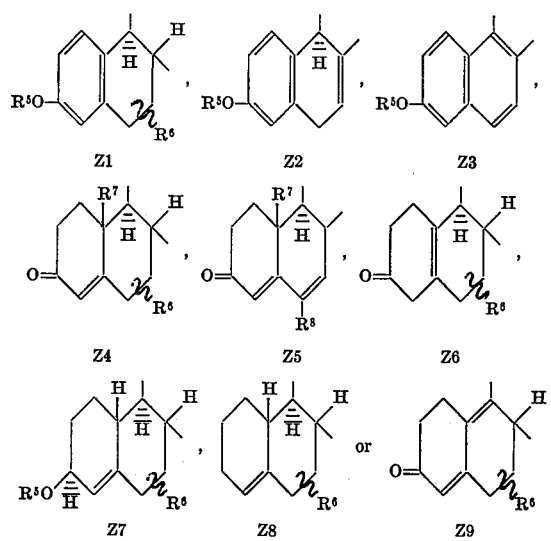

where
R$^5$ is H, lower alkyl having 1 to 3 carbon atoms, cycloalkyl, or tetrahydropyranyl,
R$^6$ is H, 6α-methyl or 7α-methyl,
R$^7$ is H, or methyl,
R$^8$ is H, halogen having an atomic weight of about 19 to 36, or methyl
which comprises isomerizing an intermediate compound of the formula

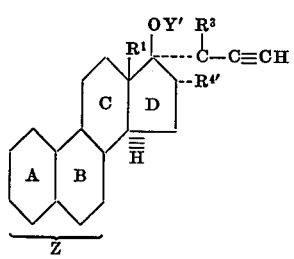

wherein
R$^1$, R$^3$, R$^{4'}$, Y' and Z have the above-stated significance, in a solution of an alkali metal hydroxide in a solvent at a temperature of from 50°C to 150°C 27. A process of claim 26 wherein Y' is methyl.
28. A process of claim 26 wherein Y' is tetrahydropyranyl.
29. A process of claim 26 wherein the alkali metal hydroxide is sodium hydroxide and the solvent is dimethylsulfoxide.
30. A process for preparing a compound of the formula

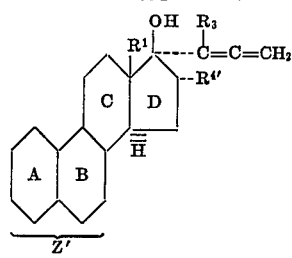

wherein
R$^1$ is alkyl having 1 to 3 carbon atoms,
R$^3$ is alkyl having 1 to 3 carbon atoms,
R$^{4'}$ is H, or hydroxy,
Z' embracing rings A, B and a portion of C and the substituents thereon is

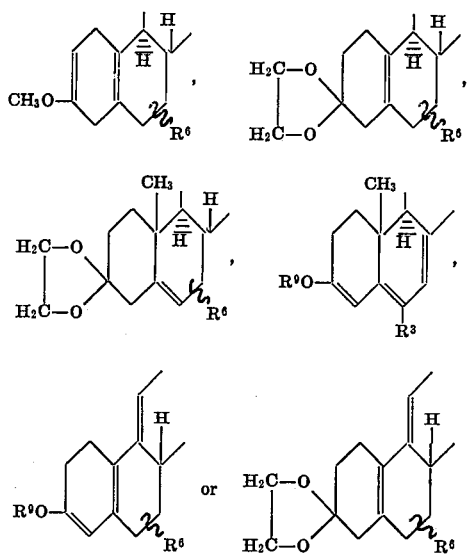

where
R$^6$ is H, 6α-methyl or 7α-methyl,
R$^8$ is H, halogen having an atomic weight of about 19 to 36, or methyl, and
R$^9$ is alkyl
which comprises treating a compound of the formula

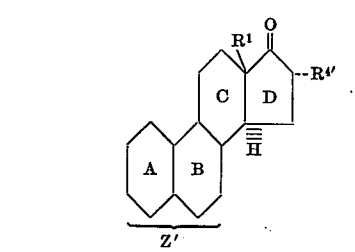

where Z', R$^1$ and R$^{4'}$ are as defined above, with an organometallo reagent prepared by reacting a compound of the formula

R$^3$—C ≡ C—CH$_2$X wherein R$^3$ is alkyl having 1 to 3 carbon atoms, and wherein X is chlorine, bromine or iodine with a metal selected from the group consisting of magnesium, zinc, lithium or aluminum and hydrolyzing the resulting adduct.

31. A process for preparing a compound of the formula

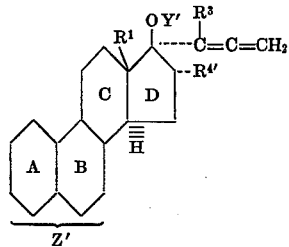

wherein
R¹ is alkyl having 1 to 3 carbon atoms,
R³ is alkyl having 1 to 3 carbon atoms,
R⁴' is H, or hydroxy,
Y' is methyl or tetrahydropyranyl,
Z' embracing rings A, B and a portion of C and the substituents thereon is

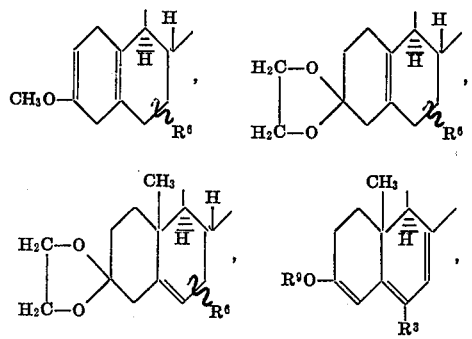

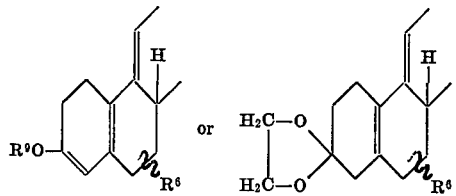

where
R⁶ is H, 6-methyl or 7-methyl,
R⁸ is H, halogen having an atomic weight of about 19 to 36, or methyl, and
R⁹ is alkyl
which comprises isomerizing an intermediate compound of the formula wherein R¹, R³, R⁴', Y' and Z' have the above-stated significance, in a solution of an alkali metal hydroxide in a solvent at a temperature of from 50°C to 150°C.

* * * * *